US011878822B2

(12) United States Patent
Milla et al.

(10) Patent No.: US 11,878,822 B2
(45) **Date of Patent: *Jan. 23, 2024**

(54) SANITARY FILL HEAD

(71) Applicant: John Bean Technologies Corporation, Chicago, IL (US)

(72) Inventors: Jose Daniel Milla, Lakeland, FL (US); Philip Gregory Hebbler, Winter Haven, FL (US); Brandon Coles, Temple Terrace, FL (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,341

(22) Filed: Jun. 3, 2022

(65) Prior Publication Data

US 2022/0355956 A1 Nov. 10, 2022

Related U.S. Application Data

(63) Continuation of application No. 17/111,410, filed on Dec. 3, 2020, now Pat. No. 11,352,244.

(51) Int. Cl.
*B65B 1/04* (2006.01)
*B65B 39/00* (2006.01)
(Continued)

(52) U.S. Cl.
CPC ................ *B65B 1/04* (2013.01); *B65B 3/045* (2013.01); *B65B 39/002* (2013.01); *B65B 39/12* (2013.01);
(Continued)

(58) Field of Classification Search
CPC .... B67C 3/26; B67C 3/34; B67C 9/00; B65B 1/04; B65B 39/002; B65B 39/12; B65B 3/04; B65B 3/045
See application file for complete search history.

(56) References Cited

U.S. PATENT DOCUMENTS 4,458,734 A * 7/1984 Scholle ................. B65B 55/022
422/219
4,498,508 A * 2/1985 Scholle ................. B65B 55/022
422/219

(Continued)

FOREIGN PATENT DOCUMENTS

EP 2 028 108 A1 ‡ 2/2009
EP 2 028 108 A1 2/2009

(Continued)

OTHER PUBLICATIONS

International Search Report and Written Opinion dated Mar. 29, 2022, issued in corresponding International Application No. PCT/U2021/061626, filed Dec. 2, 2021, 11 pages.‡

*Primary Examiner* — Nicolas A Arnett
(74) *Attorney, Agent, or Firm* — Christensen O'Connor Johnson Kindness PLLC

(57) ABSTRACT

A filler head apparatus 20 for hygienically filling and emptying containers 22 through a fitment 24 incorporated with the container 22 includes a cylindrical outer housing 30 for receiving a hollow bore inner cylinder 32 which is actuated to simultaneously reciprocate and rotate about a central axis 33 within the outer housing. A transfer tube assembly 34 is mounted to the inner cylinder 32 to travel with the inner cylinder between an extended position engaged with the fitment 24 and a retracted position disengage from the fitment. When the transfer tube assembly is engaged with the fitment, flowable content or product may be transferred to or from the container 22. A fitment cap assembly 36 is also mounted to the inner cylinder 22 to travel with the inner cylinder to remove the cap 38 of the fitment 24 prior to either filling or emptying the container 22, and then to retract to a standby position while the (Continued)

container is filled/emptied, and thereafter replacing the fitment cap after filling/emptying has been completed.

26 Claims, 8 Drawing Sheets

(51) Int. Cl.

| | |
|---|---|
| ***B65B 39/12*** | (2006.01) |
| ***B67C 3/26*** | (2006.01) |
| ***B67C 3/34*** | (2006.01) |
| ***B67C 9/00*** | (2006.01) |
| ***B65B 3/04*** | (2006.01) |

(52) U.S. Cl.

CPC .................. *B67C 3/26* (2013.01); *B67C 3/34* (2013.01); *B67C 9/00* (2013.01)

(56) References Cited

U.S. PATENT DOCUMENTS

| | | | | |
|---|---|---|---|---|
| 4,572,252 | A * | 2/1986 | Ponzi | B65B 39/00 141/90 |
| 4,893,733 | A * | 1/1990 | Thomsen | B65B 39/00 285/364 |
| 5,095,962 | A * | 3/1992 | Lloyd-Davies | B65B 3/045 141/354 |
| 6,070,622 | A * | 6/2000 | Rutter | B65B 55/022 141/2 |
| 7,373,959 | B2 * | 5/2008 | Edwards | B65D 5/746 141/10 |
| 8,517,061 | B2 * | 8/2013 | Johnson | B67D 7/005 141/2 |
| 8,596,308 | B2 * | 12/2013 | Schrader | B65D 88/748 141/2 |
| 9,862,588 | B2 * | 1/2018 | Johnson | B67D 1/0835 |
| 11,027,965 | B2 * | 6/2021 | Chen | B67B 7/182 |
| 11,352,244 | B1 * | 6/2022 | Milla | B65B 1/04 |
| 2009/0149689 | A1 * | 6/2009 | Crawford | G21F 9/16 588/1 |
| 2014/0345233 | A1 * | 11/2014 | Parisini | B65B 31/024 53/167 |

FOREIGN PATENT DOCUMENTS

| | | | |
|---|---|---|---|
| WO | 03/022314 | A2 | 3/2003 |
| WO | WO-03/022314 | A2 ‡ | 3/2003 |

* cited by examiner
‡ imported from a related application

SANITARY FILL HEAD

CROSS-REFERENCE TO RELATED APPLICATION

This application is a continuation of U.S. patent application Ser. No. 17/111,410, filed Dec. 3, 2020 (now U.S. patent Ser. No. 11/352,244), the entire contents of which are incorporated herein by reference.

BACKGROUND

The present disclosure provides a lightweight, portable, low cost filling head for use with bulk aseptic bags for storing and transporting pasteurized flowable products, including food products.

Current aseptic fill heads are expensive, complex and too heavy to be readily portable. As such the aseptic bag must be transported to the location of the fill head for filling and emptying the bag contents. This causes difficulty if the bag cannot be easily brought to the location of the fill head, for example if the bag is disposed within a processing apparatus, such as an HPP container. Nonetheless, it is still necessary to fill the bag with flowable product prior to HPP processing and then empty the bag in a subject matter after HPP processing. Thus, it is necessary for the fill head to be sufficiently portable to be brought to the location of the bag to be filled or emptied. The present disclosure seeks to address the need for such a fill head.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a filler head apparatus is provided for filling and emptying a container with flowable material through a fitment on the container, the fitment having a removable cap, the filler head comprising:

(a) a cylindrical outer housing having a proximal end and a distal end, the outer housing configured with a fitment opening at the distal end to receive the container fitment;

(b) a hollow inner cylinder slidably engaged within the outer housing to telescopically slide within the outer housing to advance toward and retract away from the outer housing distal end;

(c) a transfer tube assembly extending through the inner cylinder through which the flowable material flows when filling and emptying the container, the transfer tube having a leading end connectable to the fitment and an opposite end connectable to an external source of flowable material or to an external receptacle for the flowable material;

(d) a fitment cap assembly positioned within the inner cylinder for removing the fitment cap from the fitment and attaching the fitment cap to the fitment, the apparatus having a leading end engageable with the fitment cap; and (e) an actuating system that selectively positions the leading end of the transfer tube assembly at the fitment or the leading end of the fitment cap assembly at the fitment when the inner cylinder is advanced to the distal end of the outer housing and correspondingly retracts the leading end of the transfer tube assembly away from the fitment or the leading end of the fitment cap assembly away from the fitment when the inner cylinder is retracted from the distal end of the outer housing.

In any of the embodiments described herein, the transfer tube assembly is mounted on the inner cylinder to be advanced and retracted relative to the fitment as the inner cylinder advances and retracts relative to the distal end of the outer housing.

In any of the embodiments described herein, the actuating system rotates the inner cylinder to align the leading end of the transfer tube with the fitment.

In any of the embodiments described herein, the actuating system rotates the inner cylinder as the inner cylinder is advanced toward the housing distal end to align the leading end of the transfer tube with the fitment.

In any of the embodiments described herein, the actuating system comprises a first cam groove extending along an elongate path formed in the inner cylinder and a first cam pin projecting inward from the outer housing and engageable within the first cam groove to cause the inner cylinder to rotate to align the leading end of the transfer tube with the fitment as the inner cylinder is advanced toward the housing distal end.

In any of the embodiments described herein, wherein:

the inner cylinder is elongate;

the path of the first cam groove extends along an arcuate path relative to the length of the inner cylinder.

In any of the embodiments described herein, further comprising a control system for selectively actuating the first cam to engage with and disengage from the first cam groove.

In any of the embodiments described herein, the actuating system rotates the inner cylinder to a neutral position as the inner cylinder is retracted away from the housing distal end.

In any of the embodiments described herein, the fitment cap assembly is mounted on the inner cylinder to be advanced and retracted relative to the fitment as the inner cylinder advances and retracts relative to the distal end of the outer housing.

In any of the embodiments described herein, the actuating system rotates the inner cylinder to align the leading end of the fitment cap assembly with the fitment.

In any of the embodiments described herein, the actuating system rotates the inner cylinder as the inner cylinder is advanced toward the housing distal end to align the leading end of the fitment cap assembly with the fitment.

In any of the embodiments described herein, the actuating system comprises a second cam groove extending along an elongate path formed in the inner cylinder and a second cam pin projecting inward from the outer housing and engageable within the second cam groove to cause the inner cylinder to rotate to align the leading end of the fitment cap assembly with the fitment as the inner cylinder is advanced toward the housing distal end.

In any of the embodiments described herein, wherein:

the inner cylinder is elongate;

the path of the second cam groove extends along an arcuate path relative to the length of the inner cylinder.

In any of the embodiments described herein, further comprising a control system for selectively actuating the second cam to engage with and disengage from the second cam groove.

In any of the embodiments described herein, the transfer tube assembly and the fitment cap assembly are mounted on the inner cylinder to be advanced and retracted relative to the fitment as the inner cylinder advances and retracts relative to the distal end of the outer housing.

In any of the embodiments described herein, the actuating system rotates the inner cylinder as the inner cylinder is advanced toward the housing distal end to align the leading end of either the transfer tube assembly or fitment cap assembly with the fitment.

In any of the embodiments described herein, the actuating system comprises first and second cam grooves extending along elongate paths formed in the inner cylinder and first and second cam pins projecting inward from the outer housing and selectively engage within the first and second cam grooves to cause the inner cylinder to rotate to align the leading end of the filler tube or the leading end of the fitment cap assembly with the fitment as the inner cylinder is advanced toward the housing distal end.

In any of the embodiments described herein, wherein:

the inner cylinder is elongate;

the paths of the first and second cam grooves extend along an arcuate path relative to the length of the inner cylinder.

In any of the embodiments described herein, further comprising a control system for selectively actuating the first and second cams to engage and disengage from the first and second cam grooves, respectively.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
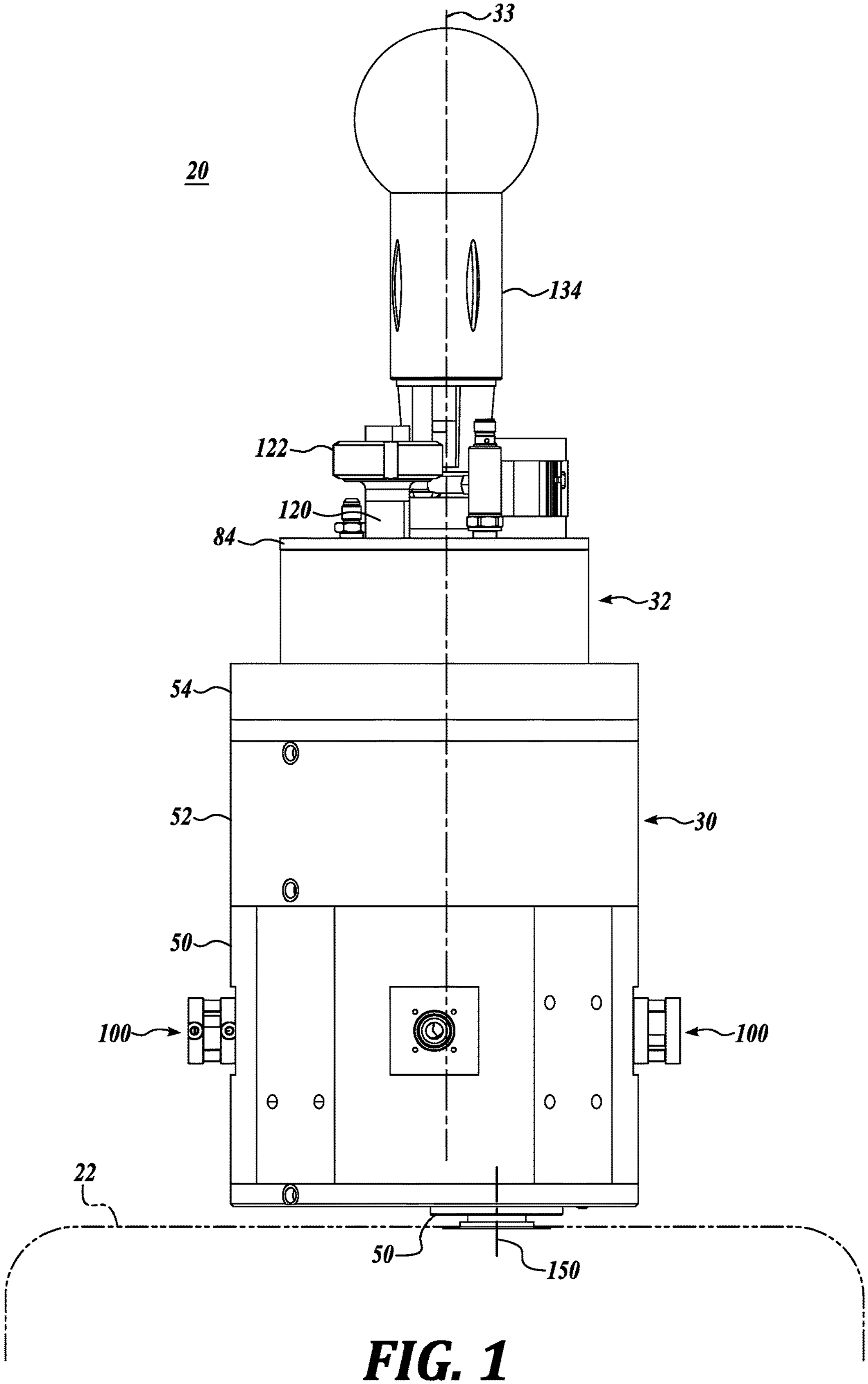
FIG. 1 is an elevational view of an embodiment of the filler head present disclosure.
Figure 2:
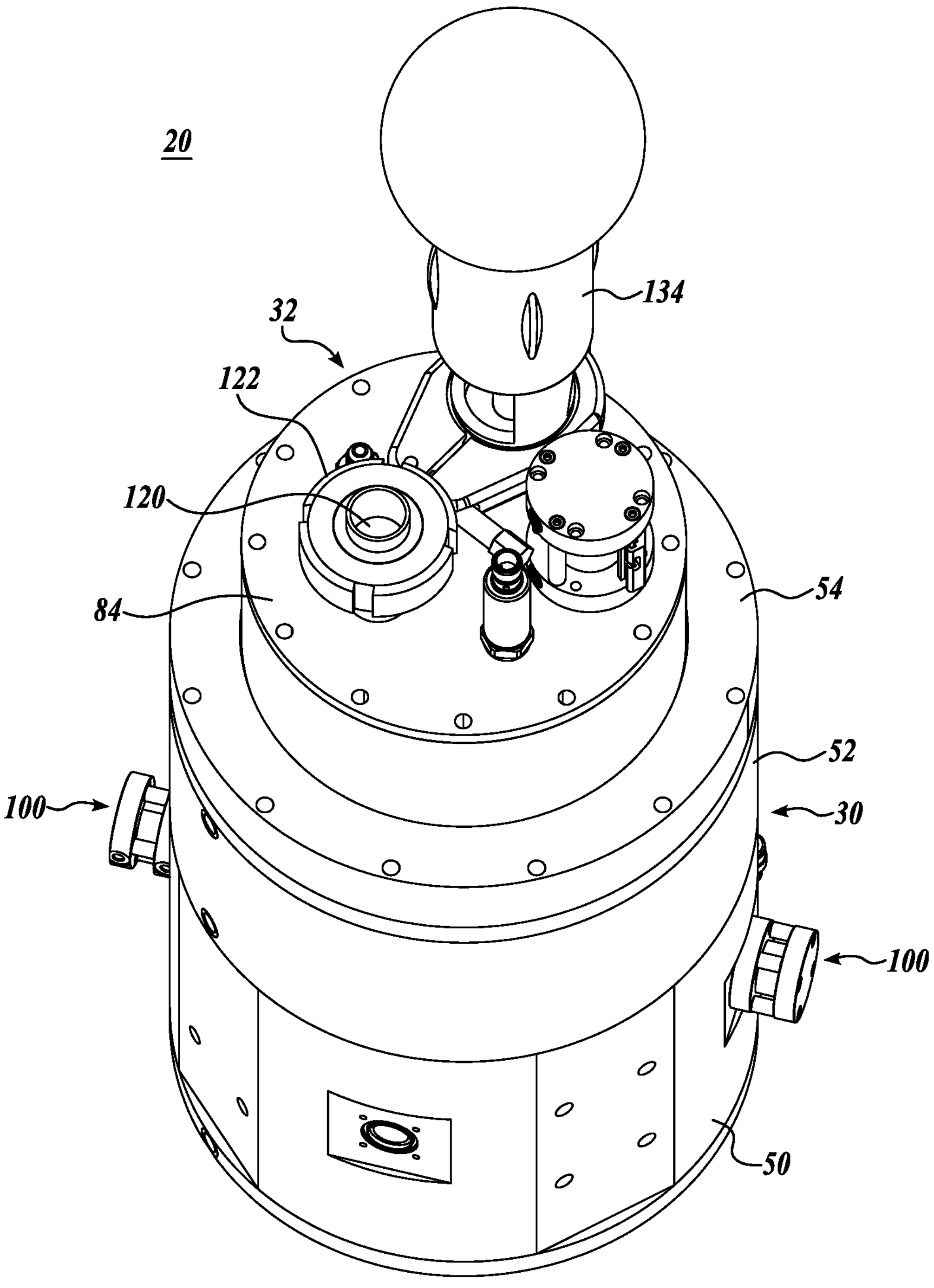
FIG. 2 is a isometric view looking down at the top of FIG. 1.

The description set forth below in connection with the appended drawings, where like numerals reference like elements, is intended as a description of various embodiments of the disclosed subject matter, and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

In the following description, filler head apparatus is described as including an outer cylindrical housing within which telescopes and inner cylinder. In the following description, the movement of the inner cylinder into the outer housing is described as the "advancing" or "forward" or "engaged" direction of movement, whereas the movement of the inner cylinder in the direction out of the outer housing is termed the "retracted" or "retracting" position or direction A shown in the figures, a filler head apparatus filler head apparatus 20 for hygienically filling and emptying containers 22 through a fitment 24 incorporated with the container 22 includes, in basic form, an outer housing 30, shown as being of a cylindrical shape, for receiving a hollow bore inner cylinder 32 which simultaneously reciprocates and rotates about a central axis 33 within the outer housing. A transfer tube assembly 34, see e.g., FIGS. 4-7, is mounted to the inner cylinder 32 to travel with the inner cylinder between an extended position engaged with the fitment 24 and a retracted position disengage from the fitment. When the transfer tube assembly is engaged with the fitment, flowable content or product may be transferred to or from the container 22.

Figure 3:
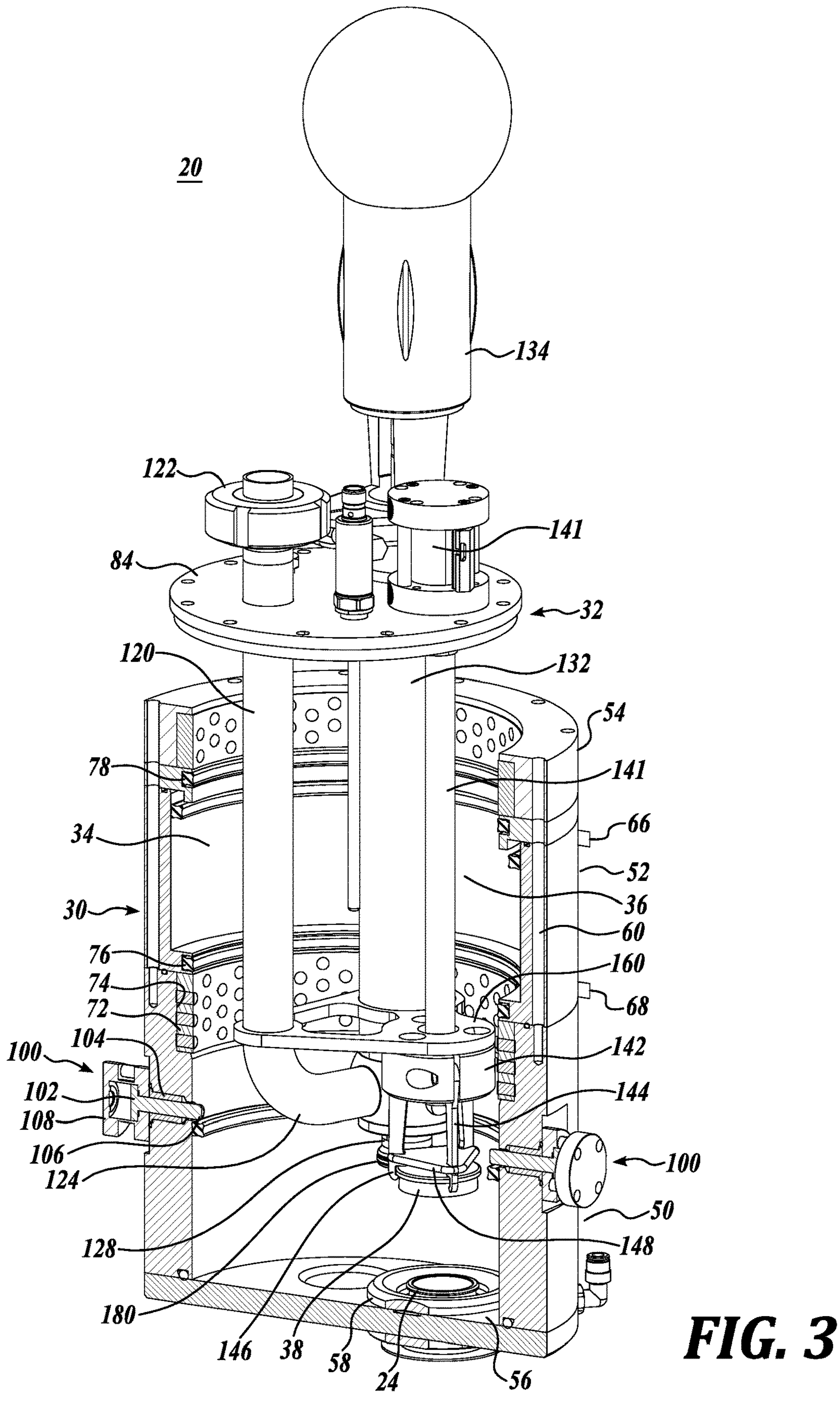
FIG. 3 is a view similar to FIG. 2, with portions of the filler have shown in cross-section.
Figure 5:
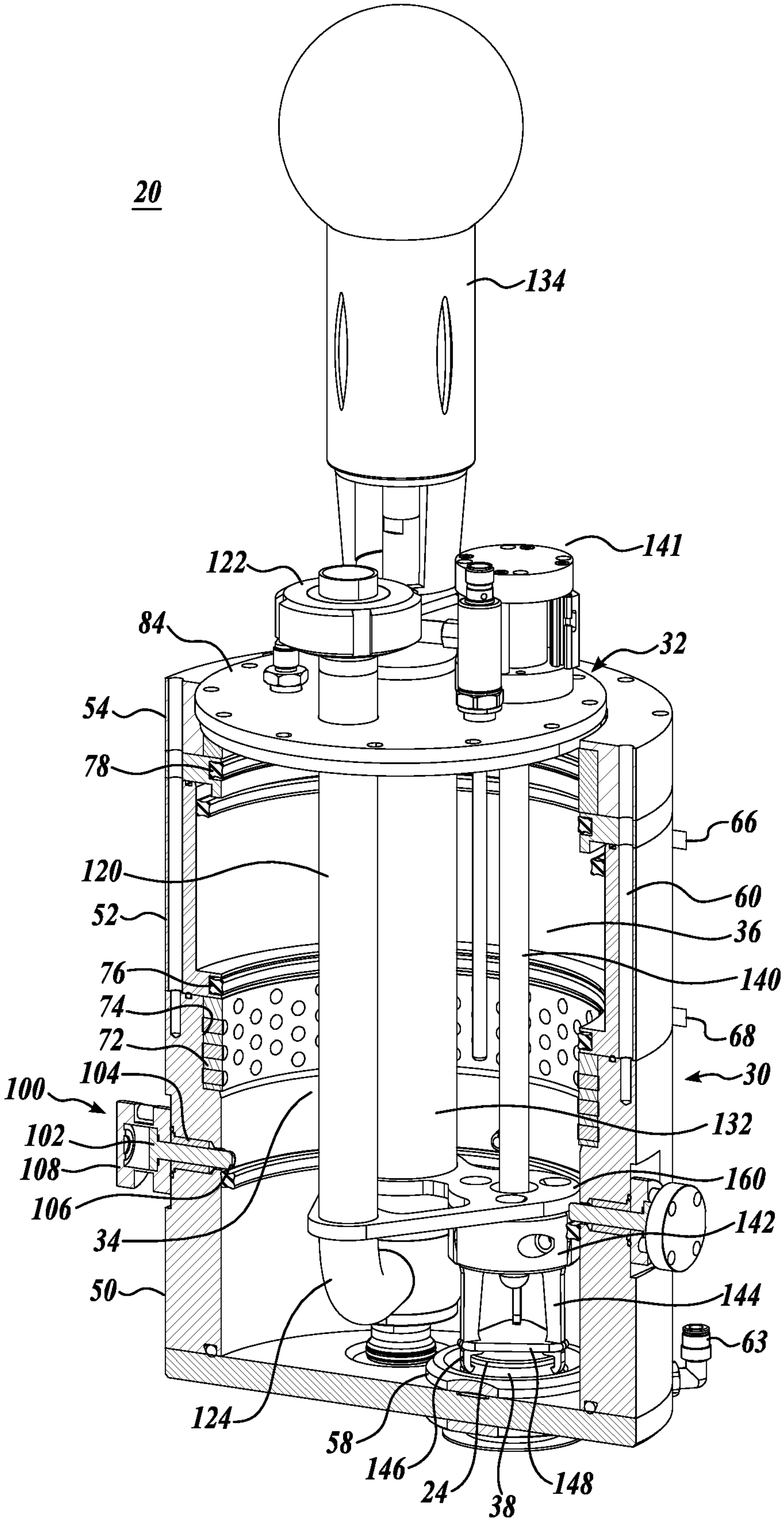
FIG. 5 is a view similar to FIG. 4 showing the fitment cap assembly engaged with a fitment.
Figure 7:
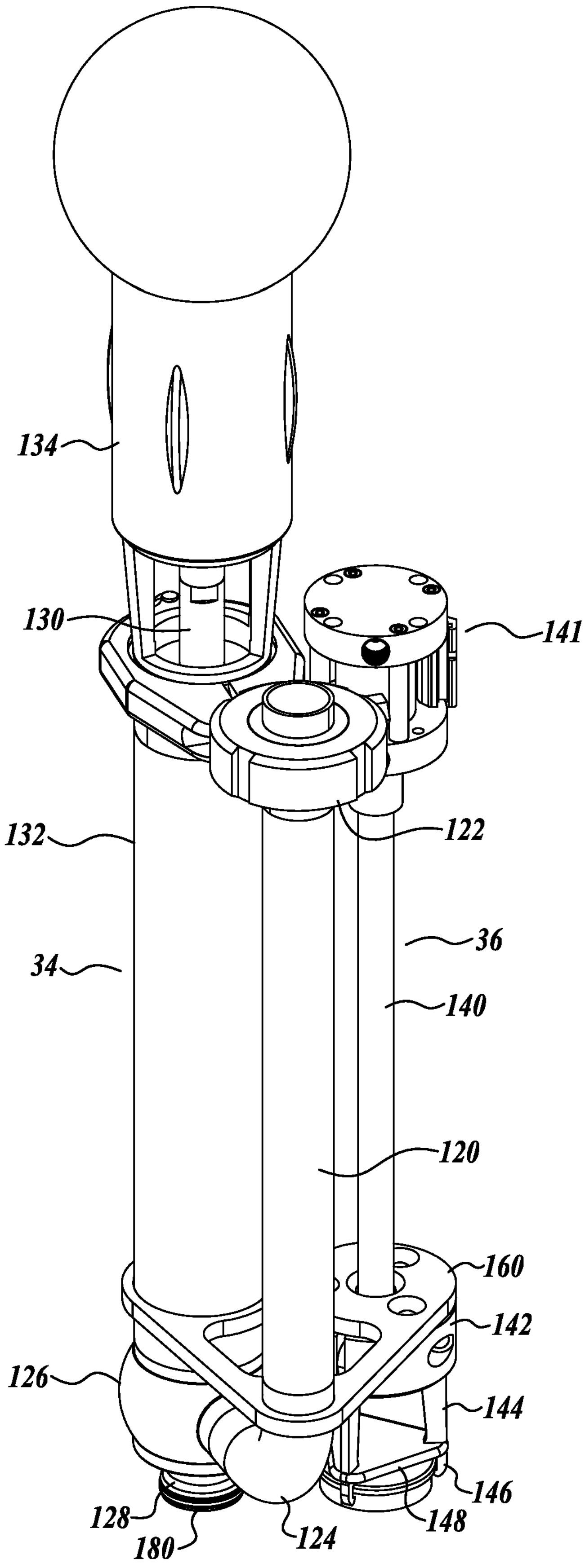
FIG. 7 is an isometric view of the fitment cap assembly assembled with the filler tube assembly.

A fitment cap assembly 36, see FIGS. 3, 5 and 7, is also mounted to the inner cylinder 32 to travel with the inner cylinder to remove the cap 38 of the fitment 24 prior to either filling or emptying the container 22, and then to retract to a standby position while the container is filled/emptied, and thereafter replacing the fitment cap after filling/emptying has been completed. An actuating system 40 is employed to advance and retract the inner cylinder 32 within the outer housing 30 and simultaneously rotate and advance the inner cylinder to position either the transfer tube assembly 34 or fitment cap assembly 36 into engagement with the fitment 24 or to retract the inner cylinder to a "home" position where both the transfer tube assembly 34 and fitment cap assembly 36 are spaced away from the fitment 24. A digital processer based control system controls the operation of the actuating system, which in turn controls the movement of the inner cylinder 32.

Describing the foregoing components of the filler head apparatus 20 in greater detail, as shown in FIGS. 1-6, the outer housing 30 is composed of a base section 50, an intermediate section 52, and a top or end section 54. The three sections of the outer housing 30 are securely attached together by hardware members or other standard means to form a rigid structure. A circular base plate 56 closes off the housing base section 50. An opening is formed in the base plate 56, and a collar fitting 58 is disposed in the opening. The fitment 24 engages through the collar fitting 58 so that the fitment cap 38 is positioned within the interior of the outer housing 30.

Figure 4:
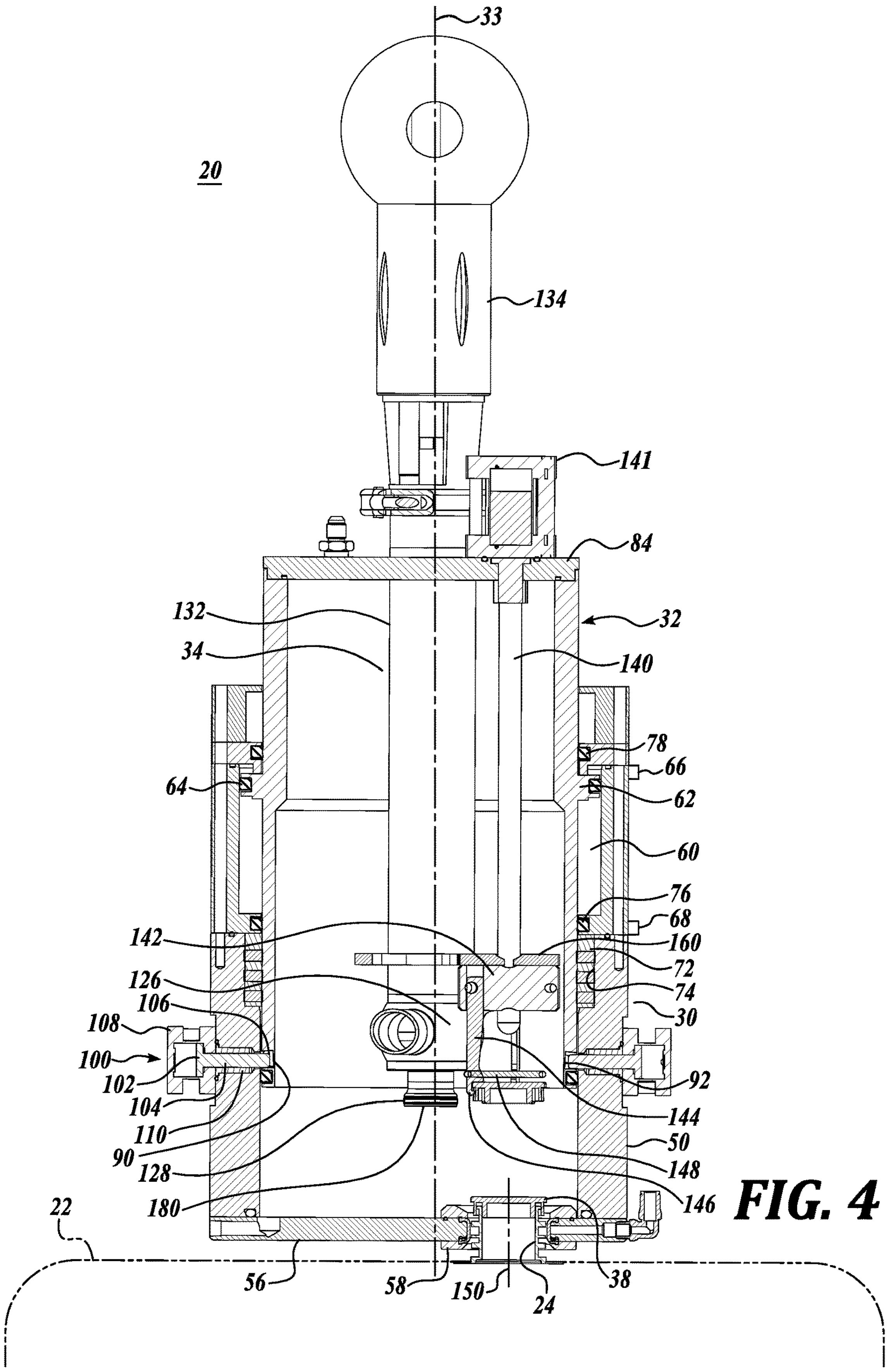
FIG. 4 is a view similar to FIG. 3, in elevational view.
Figure 6:
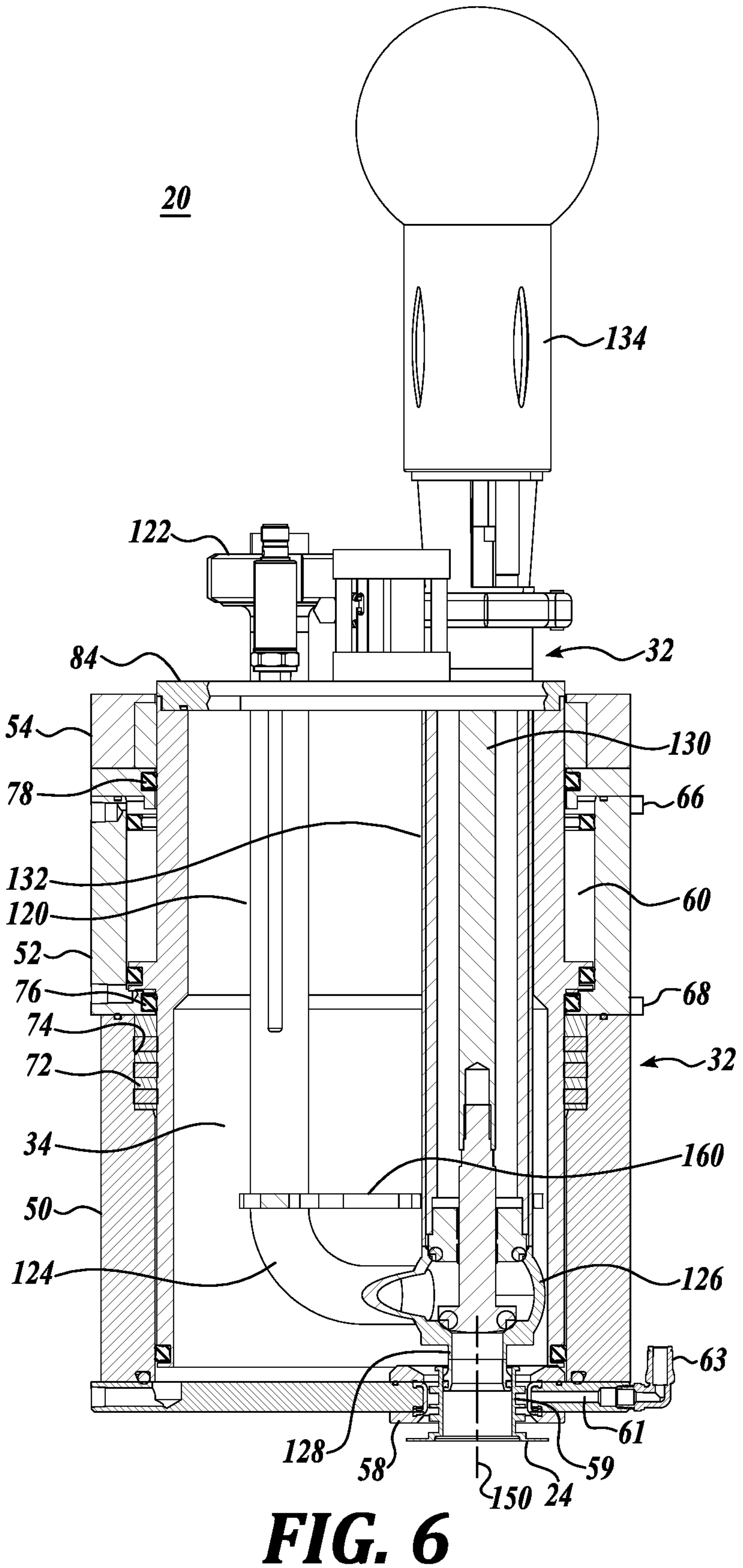
FIG. 6 is a view similar to FIG. 5, showing the filler tube assembly engaged with a fitment.

The fitment 24 is held captive in the collar fitting 58 by an inflatable ring 59 disposed within a bore 61 formed in the base plate 56, see FIGS. 4, 5 and 6. The inflatable ring 59 is pneumatically operated with pressurized air directed to the bore 61 by a fitting 63 positioned externally of the outer cylinder housing 30.

A piston chamber 60 is formed by the inside circumferential surface of the intermediate section 52 of the outer housing 30 and the outer circumferential surface of the inner cylinder 32. A ring or shoulder 62 extends outward from the inner cylinder 32 to be closely adjacent the inside circumferential surface of the intermediate section 52. A ring seal 64 is seated within a groove formed in the outward edge of the ring/shoulder 62 to seal against the inside circumferential surface of the intermediate section 52. Fluid ports 66 and 68 are positioned at the top and bottom of the piston chamber 60 through which fluid, for example pressurized air, is introduced into and expelled from the piston chamber when desiring to advance or retract the inner cylinder 32.

A lower seal 72 is seated in a counterbore 74 formed in the base section 50 of the outer housing 30 to seal against the inner cylinder 32. An intermediate seal 76 is positioned within a seat formed in the outer housing intermediate section 52 adjacent the outer housing base section 50 also to seal against the inner cylinder 32. An upper seal 78 is disposed within the seal formed in the outer housing end section 50 adjacent the intermediate section 52 to also seal against the inner cylinder 32. These seals prevent leakage of air or other fluid medium from the piston chamber 60, as well as seal the interior of the filler head apparatus 20 from the ambient.

Although the outer housing 30 is described and illustrated as constructed from three sections 50, 52, and 54, it is to be appreciated that the outer housing can be constructed from a larger number or a fewer number of sections. For example, the outer housing 30 could be constructed from two sections or even a singular section.

As noted above, the hollow bore inner cylinder 32 telescopes within outer housing 30 to place the transfer tube assembly 34 or the fill cap assembly 36 into or out of engagement with the fitment 24. A circular top plate 84 closes off the end of the inner cylinder 32 distal from the outer housing base 50. The transfer tube assembly 34 and the fitment cap assembly 36 are mounted on the top plate 84, as described more fully below.

Figure 8:
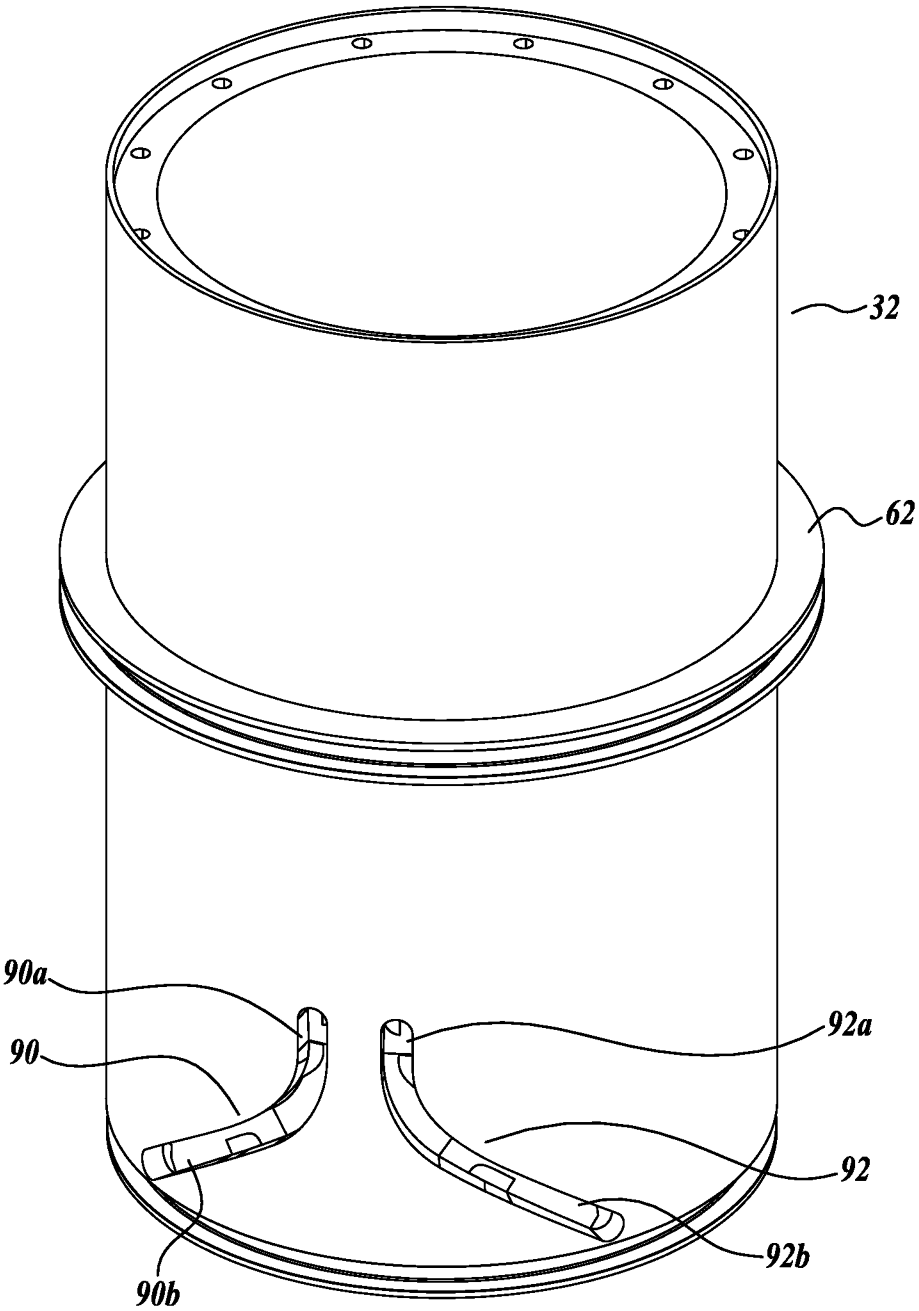
FIG. 8 is an isometric view of the hollow bore inner cylinder.

Referring specifically to FIGS. 4 and 8, pairs of cam slots 90 and 92 or formed in the outer surface of the inner cylinder 32. Mirror images of cam slots 90 and 92 are formed in the diametrically opposite sides of the inner cylinder 32. The cam slots are formed with sections **90*a* and 92*a*, which extend a relatively short distance along the length of the inner cylinder 32, and then the cam slots curve outwardly and diagonally along sections 90*b* and 92*b* toward the leading end 94 of the inner cylinder 32**.

A guide cylinder assembly 100 is associated with each of the cam slots 90 and 92 for causing the inner cylinder 32 to selectively rotate as the inner cylinder is advanced and retracted relative to the outer housing 30. To this end, each of the guide cylinder assemblies 100 is mounted to the exterior of the outer housing 30 and registry with a corresponding cam slot 90 and 92. Each of the guide cylinder assemblies 100 includes a head section 102 exterior to the outer housing 30 and a shank or pin section 104 projecting diametrically inwardly from the head section 102 through a close-fitting clearance hole formed in the wall of the outer housing to engage within cam slot 90 or 92 formed in the inner cylinder 32. A bushing or sleeve 106 may be engaged over the leading end of the pin section 104 for anti-friction engagement with the cam slots 90 and 92. In this regard, the bushing or sleeve may rotate relative to the leading end of the pin section 104.

The head section 102 of the guide cylinder assembly 100 is engaged within a pneumatic outer cylinder 108 that projects radially from the exterior surface of the outer housing 30. An air supply line, not shown, is connected to the outer cylinder 108 to actuate (retract) the pin section 104 from the cam slot 90 or 92. The pin section 104 is nominally biased into engagement with a cam slot 90 or 92 by a compression spring 110 engaged over and acting on the pin section 104 to urge the pin section into engagement within a cam slot 90 or 92. Alternatively, the guide cylinder assembly 100 may be double acting so that the extended or retracted position of the pin section 104 is controlled by air pressure applied to either side of the head section 102 of the guide cylinder assembly in a standard manner.

As can be appreciated depending on what specific guide cylinder assembly 100 is actuated to be engaged with cam slot 90 or 92, the inner cylinder 32 rotates about central axis 33 in one direction or the other as the inner cylinder is advanced into the outer housing. When the inner cylinder 32 is in retracted position, the pin section 104 of one of the guide cylinder assemblies 100 is positioned at the end of a slot section **90*b* or 92*b* corresponding to one of the cam slots 90 or 92. Whereas, when the inner cylinder 32 is in extended position toward the outer cylinder base 56, the pin section 104 of a guide cylinder assembly 100 is engaged within a slot section 90*a* or 92*a* of one of the cam slots 90 or 92**.

As noted above, the transfer tube assembly 34 functions to fill the container 22 from an external source of flowable material as well as to empty a filled container of flowable material. To this end, the transfer tube assembly includes a product flow tube 120 attached to and extending through the top plate 84 and into the interior of the inner cylinder 32. A connection fitting 122 is attached to the end of the flow tube 120 extending outwardly or exterior of the top plate 84 for connection to a hose or tube or other type of flow line through which flowable material enters the flow tube 120 or exits the flow tube. An elbow 124 is disposed at the lower end of the flow tube 120 connect the flow tube with a flow valve 126 leading to a nipple 128, which is engageable with fitment 24 when filling or emptying container 22.

The flow valve 126 may be opened and closed by a valve plate disposed within the interior of the valve to allow or disallow product to flow through the nipple 128. The valve plate is raised and lowered relative a seat within the valve by an actuating rod 130 positioned within a tube assembly 132 extending through the interior of the inner cylinder 32 to a location outward of the top plate 84. The position of the actuating rod 130 is controlled by a pneumatic actuator 134 position at the top of the tube assembly 132 exterior of the inner cylinder 32. The pneumatic actuator 134 includes position sensors to sense the position of the flow valve 126.

The fitment cap assembly 36 includes an actuating rod 140 extending downwardly from a pneumatic actuator 141 mounted on the exterior surface of top plate 84. The actuator 134 includes a piston attached to the actuating rod 140, which is pneumatically controlled to raise and lower the actuating rod, which in turn causes fingers 144 pivotably mounted on an actuating head 142 at the lower end of the rod 140 to open (spread) or close. The fingers 144 have jaws 146 formed in their distal end portions to grasp the rim portion of the fitment cap 38, as shown in FIGS. 3, 4 and 5. An elastic band 148 encircles the fingers 144 adjacent the jaws 146 to maintain a constant pressure on the fingers.

The upper ends of the fingers 144 have radially inwardly directed camming surfaces that press against the lower end of the actuating rod 140. The lower end of the actuating rod 140 is tapered to a reduced diameter so that when the rod is in upward position relative to the finger camming surfaces, the jaws 146 move radially relatively inwardly towards each other, whereas when the actuating rod is in downward position, a larger diameter portion of the rod engages the finger camming surfaces, forcing the jaws 146 to spread apart.

A sensor is provided to sense if the jaws 146 are closed to an extent that the jaws are not engaged with the fitment cap 38. Thus, when the inner cylinder 32 is in extended (inward) position and the fingers are closed far enough to activate the sensor, this condition indicates that a cap 38 is not present in the jaws. However, if the jaws 146 grasp the fitment 138, the fingers remain open sufficiently so that the sensor is not activated. In this case, it can be assumed that fitment cap 38 is held by the jaws 146, and as such the fitment cap assembly can be moved away from the fitment 24 by retraction of the inner cylinder 32 relative to the outer housing 30, thereby pulling the fitment cap 38 off the fitment. It will be appreciated that during this movement, the pin section 104 of the applicable guide cylinder assembly 100 is engaged with the cam groove section 92*a*, which extends in the longitudinal direction along the inner cylinder 32. As such, the fitment 38 is pulled in the direction coinciding with the central axis 150 of the fitment.

However, if the sensor is activated when the inner cylinder 32 has been retracted relative to the outer housing, then the controller knows that for some reason the fitment cap 38 was not removed. In that case, the fingers 144 can be opened by extending the actuating rod 140 toward the actuating head 142 so that a larger diameter portion of the actuating rod 140 bears against the camming services of the fingers. Thereafter, the actuating head 142 can be extended back towards the fitment 24 to make another attempt to grasp the fitment cap 38 with the jaws 146.

When the fitment cap assembly 36 is operating properly, the sensor remains deactivated throughout the process of filling or emptying the container 22. At the end of the fill or emptying cycle, the fitment cap 38 is reinstalled on the fitment 24, then the actuating rod 140 is extended to open the fingers 144, thereby causing the jaws 146 to release the fitment cap so that the fitment can be removed from the filler head apparatus 20.

As noted above, the transfer tube assembly 34 and the fitment cap assembly 36 are mounted on the top plate 84 of the inner cylinder 32. In addition, the leading or distal ends of the product flow tube 120, tube assembly 132 and the actuating head 142 of the fitment cap assembly extend through close-fitting openings formed in a triangular-shaped brace plate 160. In this manner, the distal ends of the product flow to 120, tube assembly 132, and fitment cap assembly are held stationary relative to each other.

A steam inlet port is located on the apparatus at a convenient location, for example on the base plate 56 or the top plate 84. Steam is introduced through the inlet port to within the filler head apparatus 20 once the apparatus has been engaged with the fitment 24, thereby to sterilize the interior of the filler head apparatus 20 as well as the fitment cap 38 and the portion of the fitment 24 disposed within the filler head apparatus. The steam and condensate therefrom is evacuated from the filler head apparatus via outlet port (not shown) located on the lower plate 56.

Also, during the process of filling or emptying the container 22, low-pressure steam is constantly circulated through the interior of the filler head apparatus 20 through the steam inlet port and outlet port thereby to maintain a sterile condition within the filler head apparatus.

In the use of the filler head apparatus 20 to fill or empty container 22, the container fitment 24 is engaged through the collar fitting 58 in the base plate 56 of the outer housing as described above, the fitment is held in place by plunger 59 that engages within one of the grooves surrounding the fitment 24. At this point, sterilizing steam is introduced into the interior of the filler head apparatus 20 to sterilize the interior of the apparatus as well as the fitment cap 38 in the portion of the fitment 24 disposed within the filler head apparatus.

Next the fitment cap assembly 36 is advanced toward the fitment 24. In this regard, the guide cylinder assemblies 100 associated with the fitment cap assembly 36 are actuated to engage cam slots 92. Thereafter, pressurized air or other actuating fluid is introduced into the piston chamber 60 through port 66, causing the inner cylinder 32 to extend into the outer housing 30 and simultaneously rotating the inner cylinder 32 to index the activating head 142 in alignment with the fitment 24. The fitment cap fingers are in open position so that the jaws 146 are positioned outward of the fitment cap 38. The actuating rod 140 is retracted upwardly so that the jaws 146 can engage the rim of the fitment cap 38.

Next, the inner cylinder 32 is retracted relative to the outer housing 30, causing the fitment cap assembly to remove the fitment cap 38 from the fitment and then rotate the inner cylinder 32 to a neutral or "home" position. This is accomplished by routing pressurized air to inlet port 68 so that the inner cylinder 32 is forced away from the outer cylinder base plate 56. Thereafter, the guide cylinder assemblies 100 associated with the cam slots 92 are deactivated, causing the pin sections 104 to disengage from the cam slots.

Next, the guide cylinder assemblies 100 associated with the cam slots 90 are activated so that the corresponding pin sections 104 engage within the cam slots 90. Then, the inner cylinder 32 is again extended relative to the outer housing 30 to move towards the base plate 56 by introducing pressurized air into port 66. At the same time, the inner cylinder 32 is caused to rotate in the opposite direction relative to the direction of rotation when advancing the fitment cap assembly 36 towards the base plate 56. As a result, the nipple 128, projecting downwardly from the flow valve 126, is positioned against the end of the fitment 24. An o-ring or other type of seal 180 is mounted on the leading end of the nipple 128 to seal against the fitment.

Next, the flow valve 126 is opened by the upward movement of the actuating rod 130 within the tube assembly 132. This provides an open path between the product flow tube 120 and the container 22. At that point, the flowable product can be routed to the container 22 or routed from the container 22. During this time, as noted above, low-pressure steam is being circulated through the interior of the filler had apparatus. Once a container has been filled or emptied, the inner cylinder 32 is retracted from the base plate 56 of the outer housing 30 by introducing pressurized air into the port 68. As the inner cylinder 32 retracts, it also rotates about longitudinal axis 33 to place the inner cylinder back to "home" position.

Thereafter, the fitment cap 38 is replaced onto the fitment 24 by advancing the inner cylinder 32 toward the outer housing base plate 56 by introducing pressurized air into port 66. But before this occurs, the guide cylinder assemblies 100 associated with cam grooves 90 are retracted and the guide cylinder assemblies 100 associated with cam grooves 92 are extended so that the pin sections 104 engage into the cam grooves 92. As a result, when the inner cylinder 32 engages into the outer housing 30, the inner cylinder is caused to rotate about axis 33, to index the actuating head 142 over the fitment 24, and then press the fitment cap 38 back onto the fitment. It will be appreciated that during this engagement process, the cam grooves 92 extends substantially longitudinally relative to the length of the inner cylinder housing 32 so that the inner cylinder housing is not rotating relative to the outer housing 30, but instead is moving substantially longitudinally relative to the outer housing.

Once the fitment cap has been replaced, the inner cylinder 32 is extended (retracted) away from the base plate 56 to return to its "home" position. To this end, pressurized air is routed to the piston chamber 60 through port 68, which causes the inner cylinder to extend our move away from the outer housing base plate 56. At this point, the filling or emptying of the container 22 has been completed.

It will be appreciated that relative to the longitudinal central axis 33 of the filler head apparatus 20, the collar fitting 58, the nipple 128, and the actuating head 142 are at the same radius from the central axis 33. As a result, the nipple 128 and actuating head 142 will be in registry with the collar fitting 58.

While illustrative embodiments have been illustrated and described, it will be appreciated that various changes can be made therein without departing from the spirit and scope of the invention.

The embodiments of the invention in which an exclusive property or privilege is claimed are defined as follows:

1. A filler head apparatus for filling and emptying a container with flowable material through a fitment on the container, the fitment having a removable cap, the filler head comprising:

(a) a housing having a proximal end and a distal end, the housing configured with a fitment opening at the distal end to receive the container fitment;

(b) a transfer tube assembly positioned within the housing through which the flowable material flows when filling and emptying the container, the transfer tube having a leading end connectable to the fitment and an opposite end connectable to an external source of flowable material or to an external receptacle for the flowable material;

(c) a fitment cap assembly positioned within the housing for removing the fitment cap from the fitment and attaching the fitment cap to the fitment, the apparatus having a leading end engageable with the fitment cap; and (d) an actuating system that selectively positions the leading end of the transfer tube assembly at the fitment or the leading end of the fitment cap assembly at the fitment and correspondingly retracts the leading end of the transfer tube assembly away from the fitment or the leading end of the fitment cap assembly away from the fitment.

2. The apparatus of claim 1, wherein:

the transfer tube assembly and the fitment cap assembly are positioned the same radial distance from a longitudinal axis that extend through the housing; and the actuating system rotates the transfer tube assemble and the fitment cap assembly relative to the longitudinal axis to selectively align the transfer tube assembly and the fitment cap assembly with the fitment and selectively moves the transfer tube assembly and the fitment cap assembly toward and away from the fitment.

3. The apparatus of claim 2, wherein the actuating system rotates the housing to align the leading end of the transfer tube with the fitment.

4. The apparatus of claim 3, wherein the actuating system rotates the housing to advance the leading end of the transfer tube towards the fitment.

5. The apparatus of claim 4, wherein the actuating system comprises a first cam assembly engageable with the housing to rotate the housing to align the leading end of the transfer tube with the fitment as the transfer tube is advanced toward the fitment.

6. The apparatus of claim 5, wherein:

the housing is cylindrical in shape; and the first cam assembly comprising a first cam groove extending along an arcuate camming path formed along the cylindrical housing.

7. The apparatus of claim 5, further comprising a control system for selectively actuating the first cam assembly to engage with and disengage the first cam assembly from the housing.

8. The apparatus of claim 1, wherein the actuating system rotates the housing to align the leading end of the fitment cap assembly with the fitment.

9. The apparatus of claim 8, wherein the actuating system rotates the housing to advance the leading end of the fitment cap assembly toward the fitment.

10. The apparatus of claim 9, wherein the actuating system comprises a second cam assembly engageable with the housing to rotate the housing to align the leading end of the fitment cap assembly with the fitment as the fitment cap assembly is advanced toward the fitment.

11. The apparatus of claim 10, wherein:

the housing is cylinder in shape; and the second cam assembly comprising a second cam groove extending along an arcuate camming path formed along the cylindrical housing.

12. The apparatus of claim 10, further comprising a control system for selectively actuating the second cam assembly to engage with and disengage from the cam assembly from the housing.

13. The apparatus of claim 1, wherein the transfer tube assembly and the fitment cap assembly are mounted on the housing to be advanced and retracted relative to the fitment as the housing advances and retracts relative to the fitment.

14. The apparatus of claim 13, wherein the actuating system rotates the housing to align the leading end of either the transfer to or fitment cap assembly with the fitment.

15. The apparatus of claim 14, wherein the actuating system rotates the housing as the housing is advanced toward the fitment to align the leading end of either the transfer tube assembly or fitment cap assembly with the fitment.

16. The apparatus of claim 15, wherein the actuating system comprises first and second cam grooves extending along elongate paths formed in the housing and first and second cam followers selectively engage within the first and second cam grooves to cause the housing to rotate to align the leading end of the filler tube or the leading end of the fitment cap assembly with the fitment as the housing is advanced toward the fitment.

17. The apparatus of claim 16, wherein:

the housing is in the form of an elongate cylinder; and the paths of the first and second cam grooves extend along an arcuate path relative to the length of the cylinder.

18. The apparatus of claim 16, further comprising a control system for selectively actuating the first and second cam followers to engage and disengage from the first and second cam grooves, respectively.

19. The apparatus of claim 15, wherein the actuating system rotates the housing to a neutral position as the housing is retracted away from the fitment.

20. A filler head apparatus for filling and emptying a container with flowable material through a fitment on the container, the fitment having a removable cap, the filler head comprising:

(a) a housing having a proximal end and a distal end;

(b) a transfer tube assembly positioned within the housing through which the flowable material flows when filling and emptying the container, the transfer tube having a leading end connectable to the fitment and an opposite end connectable to an external source of flowable material or to an external receptacle for the flowable material;

(c) a fitment cap assembly positioned within the housing for removing the fitment cap from the fitment and attaching the fitment cap to the fitment, the apparatus having a leading end engageable with the fitment cap; and (d) an actuating system that selectively positions the housing to advance the leading end of the transfer tube assembly to the fitment or the leading end of the fitment cap assembly to the fitment and correspondingly to retract the leading end of the transfer tube assembly away from the fitment or the leading end of the fitment cap assembly away from the fitment.

21. The apparatus of claim 20, wherein the actuating system rotates the housing in a first direction to align the leading end of the transfer tube assembly with the fitment and rotates the housing in the opposite direction to align the leading end of the fitment cap assembly with the fitment.

22. The apparatus of claim 20, wherein the transfer tube assembly and the fitment cap assembly are mounted on the housing to be advanced and retracted relative to the fitment as the actuating system advances and retracts the housing relative to the fitment.

23. The apparatus of claim 22, wherein the actuating system rotates the housing to advance the housing toward the fitment to align the leading end of either the transfer tube assembly or fitment cap assembly with the fitment.

24. The apparatus of claim 23, wherein the actuating system comprises first and second cam grooves extending along elongate paths formed in the housing and first and second cam followers selectively engage within the first and second cam grooves to cause the housing to rotate to align the leading end of the filler tube or the leading end of the fitment cap assembly with the fitment as the housing is advanced toward the fitment.

25. The apparatus of claim 24, wherein:

the housing is in the form of an elongate cylinder; and the paths of the first and second cam grooves extend along a arcuate paths relative to the length of the cylinder.

26. The apparatus of claim 24, further comprising a control system for selectively actuating the first and second cam followers to engage and disengage from the first and second cam grooves, respectively.

* * * * *